Figure 3:
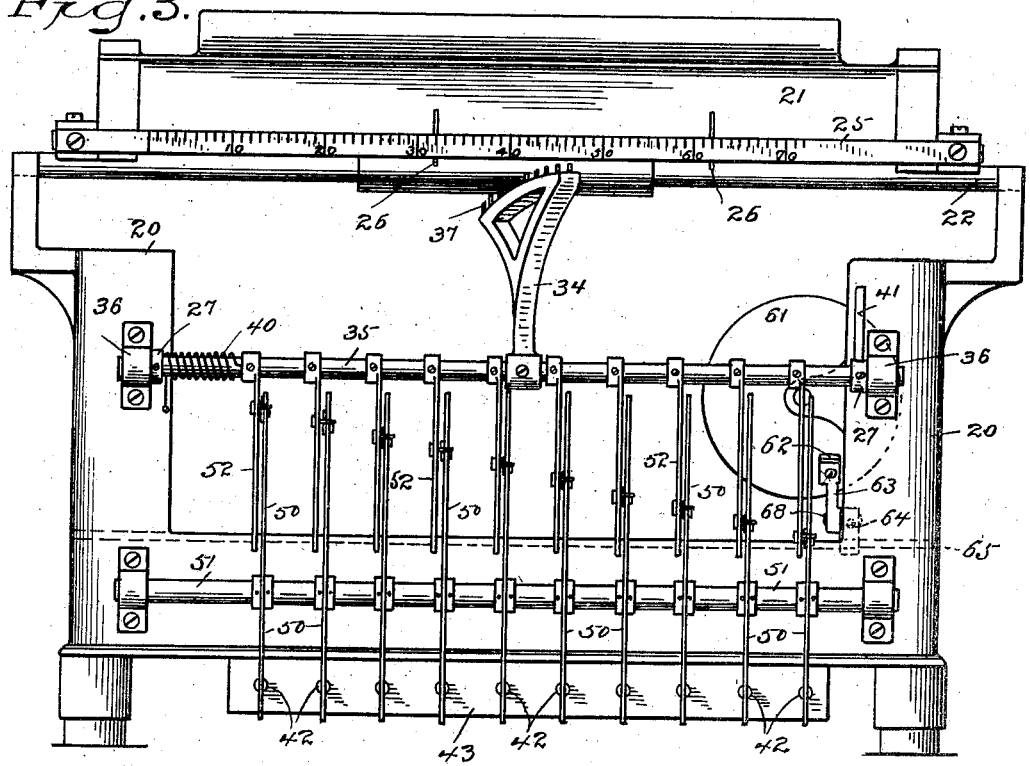

No. 852,989.
PATENTED MAY 7, 1907.
P. B. TINGLEY.
TYPE WRITER TABULATOR.
APPLICATION FILED SEPT. 22, 1905.
4 SHEETS—SHEET 1.
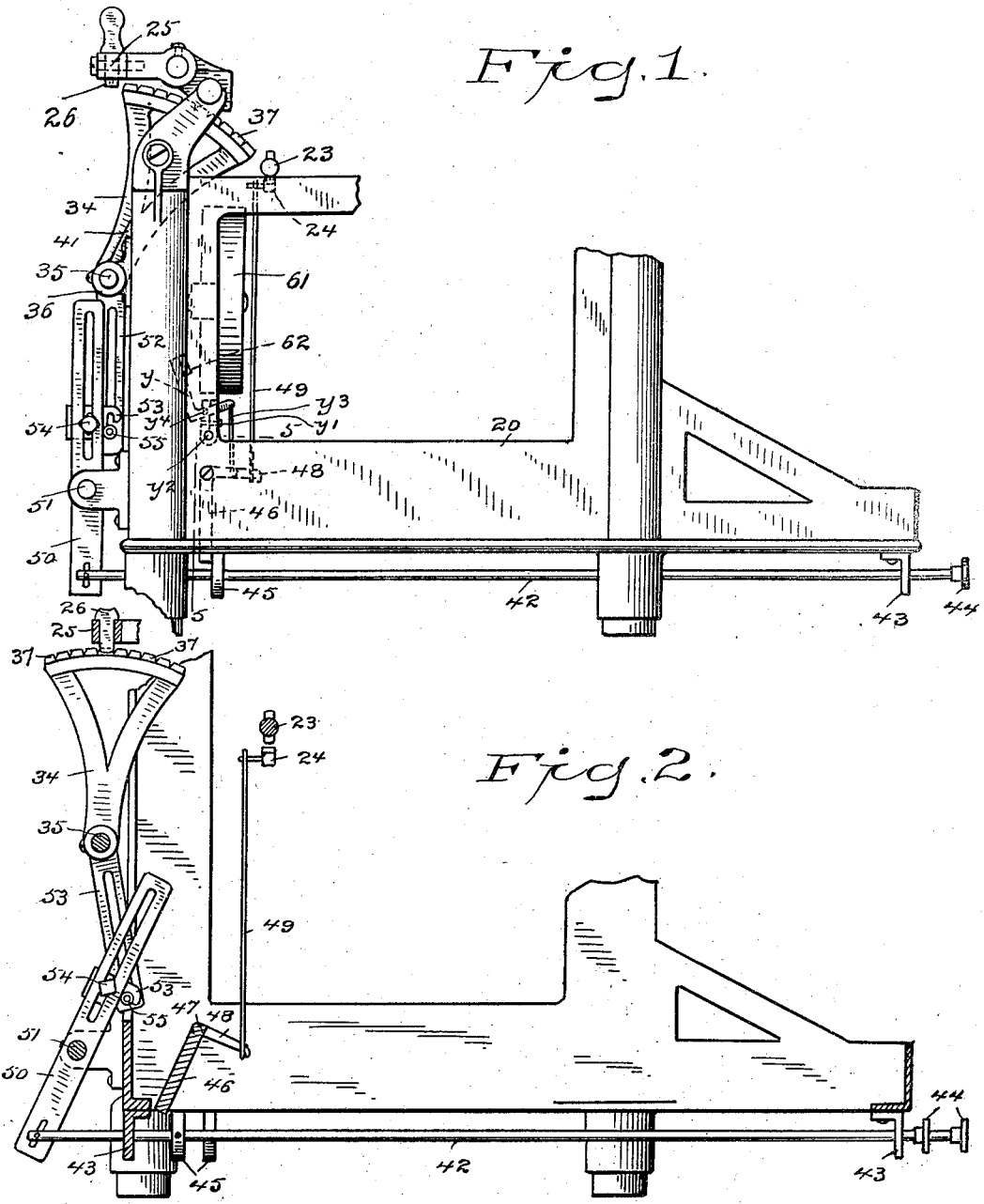

No. 852,989. PATENTED MAY 7, 1907.
P. B. TINGLEY.
TYPE WRITER TABULATOR.
APPLICATION FILED SEPT. 22, 1905.

4 SHEETS—SHEET 2.

WITNESSES
H. A. Lamb.
S. W. Atherton.

INVENTOR
Philo B. Tingley
BY
A. W. Wooster
ATTORNEY

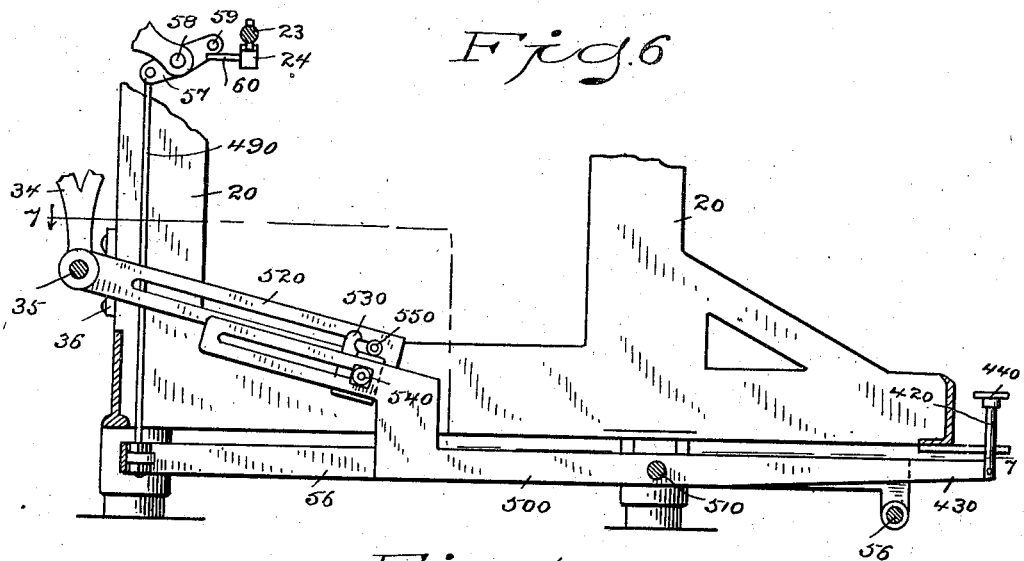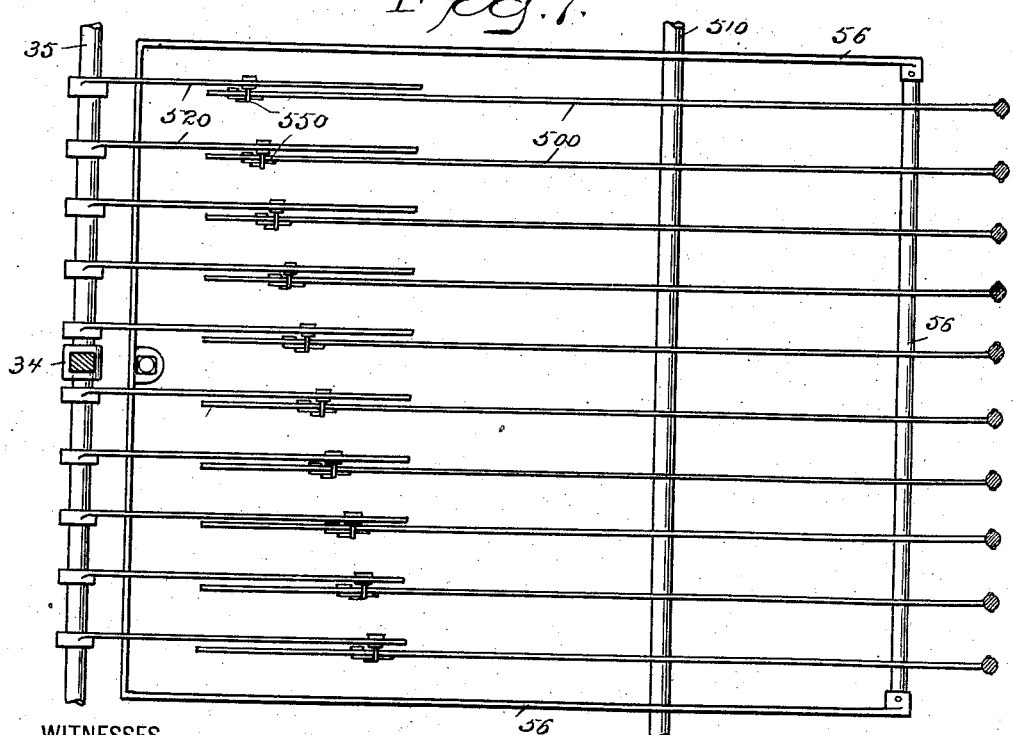

No. 852,989. PATENTED MAY 7, 1907.
P. B. TINGLEY.
TYPE WRITER TABULATOR.
APPLICATION FILED SEPT. 22, 1905.

4 SHEETS—SHEET 4.

WITNESSES
H. A. Lamb
S. W. Atherton

INVENTOR
Philo B. Tingley
BY
A. M. Wooster
ATTORNEY

UNITED STATES PATENT OFFICE.

PHILO B. TINGLEY, OF GLENRIDGE, NEW JERSEY.

TYPE-WRITER TABULATOR.

No. 852,989.    Specification of Letters Patent.    Patented May 7, 1907.

Application filed September 22, 1905. Serial No. 279,681.

*To all whom it may concern:*

Be it known that I, PHILO B. TINGLEY, a citizen of the United States, residing at Glenridge, county of Essex, State of New Jersey, have invented a new and useful Type-Writer Tabulator, of which the following is a specification.

This invention relates to typewriting machines and particularly to mechanism for enabling such machine to be used with speed and accuracy when producing tabulated work; that is columns of figures or words. Several mechanisms or attachments for attaining this result have been patented and placed on the market, such devices or mechanisms involving the temporary release of the key-controlled feed so that the carriage will be rapidly propelled by its spring from right to left to a limit prescribed by what is called tabulating stops, this movement, or the mechanism which causes it, being sometimes termed a "jump-feed." It is to this class of invention that my present invention relates, and the particular object of this said invention is to provide improved means whereby the exact position in which the carriage will be checked by a given stop may be instantly varied by the operator according to the number of characters comprising the group that is to form a line of the column. For instance, when figures are to be written for statements of account, bills, invoices etc., the numerals in the groups comprising the column usually vary considerably, and as the units must be written in a vertical line, and the tens, hundreds etc., similarly written, it is desirable for the sake of speed and accuracy that the machine shall have means for enabling the operator to determine at a glance how far the carriage shall "jump" in order to write the first numeral of the group in the proper place.

Another object of the invention is to provide a mechanism for the purpose stated comprising a single stop which may be so shifted in its position relatively to the frame of the machine as to co-act with one or more stops adjustably carried by the carriage, to limit the feed movement of the carriage to the particular position desired by the operator.

Other objects of the invention relate to the general simplicity, efficiency and desirability of the mechanism, all as will be more fully described hereinafter.

To these ends, the invention consists in the construction and combination of parts substantially as hereinafter described and claimed.

In the accompanying drawings, I have illustrated a preferred embodiment, and a modification of my invention, in connection with sufficient of the parts of an "Underwood" typewriter to enable it to be readily understood by those skilled in the art. But it is to be understood that my invention is not limited to either the particular adaptation or the exact details of the parts illustrated.

Figure 4:
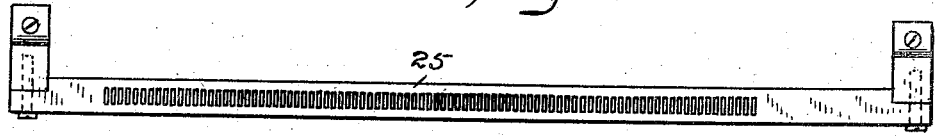
Figure 5:
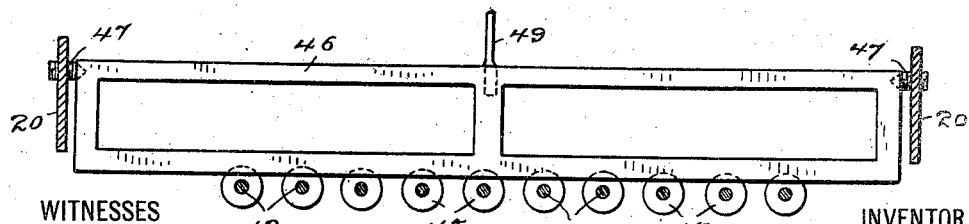
Figure 8:
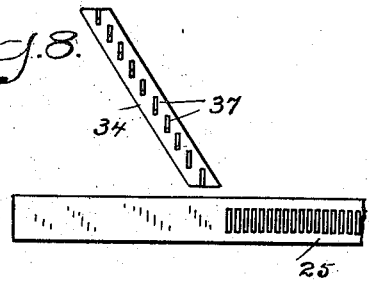
Figure 9:
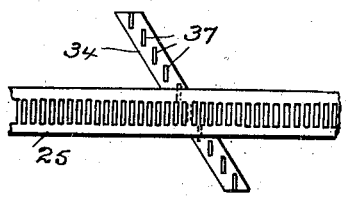
Figure 10:
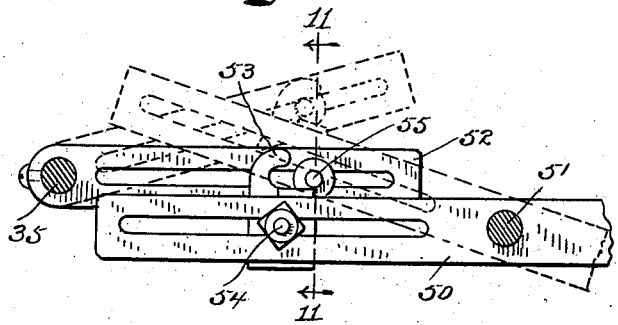
Figure 11:
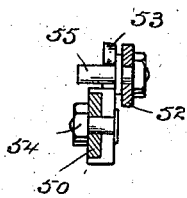
Figure 12:
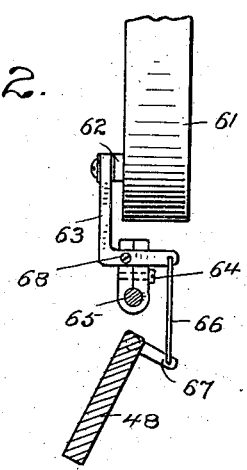

Figure 1—is a detail side elevation of a portion of an "Underwood" machine to which my invention in one of its embodiments has been applied: Fig. 2—is a sectional elevation showing the parts in a different position: Fig. 3—represents a view from the left of Fig. 1: Fig. 4—represents a detail plan view of the slotted stop bar: Fig. 5—represents a section on line 5—5 of Fig. 1: Fig. 6—is a view similar to Fig. 2 but illustrating a modification of that portion of the invention relating to the means for changing the position of the variable stop: Fig. 7—represents a section on line 7—7 of Fig. 6: Fig. 8—is a detail plan view of the shiftable stop and a portion of the slotted stop bar: Fig. 9—is a view similar to Fig. 8 but showing the parts in different relative positions: Fig. 10—is a detail view of the separable lever connections hereinafter described: Fig. 11—represents a section on line 11—11 of Fig. 10. Fig. 12 is a detail elevation of the brake mechanism operated by the swinging gate or bar, the latter being shown in section.

Similar reference characters indicate the same or similar parts throughout the several views.

The frame of the machine is indicated at 20, and one of the rods for the carriage 21 is shown at 22. 23 indicates the feed rack which is carried by and travels with the carriage. 24 indicates one of the usual vibrating feed-dogs co-operating with the rack 23 to permit the step by step movement of the carriage. All of these parts are well known and need no further description or illustration.

Referring to Figs. 1, 2, 3 and 4, a bar 25 is shown as secured at its ends to the frame of the carriage. Said bar is provided with a series of slots and has its front surface graduated or provided with scale marks to correspond with the slots in the bar and, of course, corresponding with the usual scale (not shown) at the front of the machine. In one or more of the slots of bar 25 is placed a stop 26, the shape of which is best shown in Figs. 1 and 2. I have shown but two of such stops in Fig. 3 but it is to be understood that as many will be carried by the bar 25 as there are columns to be written. The lower end of the stop 26 projects from the under side of the bar to co-act with the shiftable stop presently described. The stop is formed with an upwardly extending portion by which it may be grasped when its location is to be changed, and with a shoulder or shoulders to prevent it from slipping below substantially the position shown.

A rock shaft 35 is mounted in bearings 36 attached to the frame of the machine, said rock shaft having means, such as collars 27, to prevent said rock shaft from moving in the direction of its length. Secured to said shaft 35, substantially mid-way of the length of said shaft is an arm 34. The outer surface of said arm 34, when viewed from the end of the machine, is curved on the arc of a circle having the shaft 35 as its center (see Figs. 1 and 2). Said outer face of the arm is provided with a series of pins 37 which are preferably formed with flat sides as shown in Figs. 8 and 9 so as to present a square abutment for the downwardly projecting end of a stop 26. As shown in Figs. 3, 8 and 9 the series of pins 37 are inclined relatively to the path of movement of the arm 34, for a purpose which will be presently described.

The arm 34 and its pins 37 constitute an oscillating or shiftable stop which is adapted to co-operate with a stop 26 mounted in the bar 25, so that the travel of the carriage, under the influence of the usual carriage-shifting spring in the case 61, will be limited according to the position of a stop 26 in said bar 25. And when a stop 26 is once set, the position in which the carriage will be stopped will vary according to the position to which the arm 34 is oscillated. The pins 37 are so spaced relatively to each other in the direction of travel of the carriage as to correspond with the scale and intermittent feed of the machine, as indicated in Figs. 8 and 9. When the parts are in the position indicated in Figs. 1 and 8, the stop or stops 26 will pass freely by the shiftable stop so that the machine can be used for ordinary writing. In other words, the particular scale point at which the carriage will stop will be determined by the amount of oscillation that has been imparted to the rock-shaft 35 and arm 34. In order to hold the shiftable stop and its shaft 35 in the normal position indicated in Fig. 1, a suitable spring and stop may be employed such as indicated in Fig. 3 wherein a spring 40 is indicated as coiled about one end of the shaft 35 and connected thereto and to a suitable fixed part of the frame so as to hold the said shaft and the arm 34 in the position indicated in Fig. 1. Any suitable stop may be employed to limit the movement of said shaft and arm in the direction described, such as a stop arm 41 projecting from the shaft 35 and adapted to bear against a portion of the frame of the machine.

The means shown in Figs. 1 to 5 for actuating the rock-shaft 35 to different degrees of rotative movement so as to vary the exact position at which the carriage will be stopped, comprise a series of push-rods 42 mounted in bearings 43 under the frame of the machine and having finger pieces or keys 44 which will be suitably marked to indicate units, tens, hundreds, etc. Each rod 42 also has a collar 45 adapted to engage the lower edge of a swinging gate or bar 46 pivoted at 47 to the frame of the machine and having an arm 48 at an angle thereto. Practically, the bar 46 and its arm 48 constitute a bell crank lever adapted to be actuated by any of the push-rods. The arm 48 is connected by a link 49 to a pin projecting from the feed-dog 24 so that whenever a rod 42 is pushed in to its farthest limit, its collar 45 actuates the bell crank lever so as to pull down the dog 24 from the feed-rack 23 and thus release the carriage to permit the latter to be rapidly propelled by its spring in the manner usual with "jump-feed" devices. But before the push-rod reaches its innermost position so as to release the carriage as mentioned, the rock-shaft 35 is actuated, by means which I shall now describe, to bring the shiftable stop out of its normal inoperative position. To this end, each rod 42 is pivotally connected to a lever 50 mounted to oscillate on a fulcrum rod 51 extending across the back of the frame. Secured to and depending from the rock-shaft 35 are as many arms 52 as there are levers 50 and rods 42. The upper arm of each lever 50 is provided with a plate having a hook 53, said plate being secured to its lever by a bolt 54 or other equivalent fastening passing through a slot in the lever whereby the position of the hook may be adjusted toward or from the fulcrum of the lever. Each arm 52 has a slot in which a pin 55 is adjustably secured relatively to the fulcrum of the arm in a manner similar to the adjustment provided for the hook 53 on its lever. The pin 55 extends past the edge of the adjacent lever 50 so as to be engaged by the latter when rod 42 is pushed in; thereby causing the parts to move from the position shown in Fig. 1 to that shown in Fig. 2, the shiftable stop being thus rotated to an amount corresponding to that to which arm 52 is actuated and the point at which the pin 55 is set along its arm. As shown in Fig. 3, the location of the pins 55 of the different arms 52 vary. This is to vary the amount of movement that will be imparted to the rock-shaft and the shiftable stop by the different push-rods.

As shown in Fig. 2, the hook 55 engages the pin 56 in such manner as to lock the key or push-rod and the rock-shaft at the end of the stroke to limit the movements of all the parts and also prevent overthrow of the rock-shaft and the variable stop due to momentum.

The construction described enables any one of the tabulating key rods to be actuated without affecting the others, owing to the fact that there is no permanent connection between the levers 50 and arms 52 of each pair. While all of the arms 52 will oscillate with the rock-shaft only one lever 50 will be moved. And when one lever 50 is in the position shown in Fig. 2 no other lever 50 can be operated so as to affect the shiftable stop because the hook 53 of the actuated lever locks the rock-shaft by engaging the pin 55 of the actuated arm 52.

In Figs. 6 and 7 the levers which actuate the arms 52 are arranged to be operated by a downward instead of an upward finger movement. In said figures where the parts are for the same purpose as similar parts in the other figures, I employ the same numerals with the addition of a cipher. In said figures, the arms 520 are longer than the arms 52 in the other form, and extend inward from the rock-shaft 35 instead of downward, and are provided with pins 550. The levers 500 are mounted on fulcrum rod 510 extending under the machine, and at their inner ends carry the plates having hooks 530, said plates being adjustably secured by bolts 540 passing through the slots of the lever. The hooks 530 and pins 550 are adjustable along their slotted levers in the same manner and for the same purpose described in connection with hooks 53 and pins 55. The outer ends of the levers 500 are provided with vertical push-pieces 420 extending upward through a guide plate 430 and having finger pieces or keys 440. Mounted on the rod 510 is a rectangular lever-frame 56 having its front bar extending under the front portion of all the levers 500 and having a link 490 connecting its rear bar with one end of a short lever 57 pivoted at 58 to a suitable fixed part or projection of the frame of the machine. The other end of the short lever 57 has a pin 59 adapted to contact with a pin 60 projecting from the feed-dog 24. In this form the connections are such that upon the depression of a key 440, the rock-shaft 35 is first actuated to vary the position of the shiftable stop, which will be the same as in the other form first described, and then the lever frame will be actuated to lift the link 490 and cause the pin 59 of lever 57 to disengage the feed-dog 24 from the rack 23 and permit the carriage to "jump" as far as permitted by a stop 26.

In Figs. 10 and 11, I have illustrated on a somewhat enlarged scale a portion of the arms 52 and of the levers 50. In Fig. 10 the arm 52 and a lever 50 are shown by full lines in horizontal positions. This is for convenience of illustration and it will be understood that Fig. 10 should be turned one-fourth to the right if it is to be compared with the form shown in Fig. 2. Said Figs. 10 and 11 show in full lines how the pin 55 is engaged by the edge of the lever 50 so that the former will be actuated by the latter. The dotted lines in Fig. 10 represent these parts when they have been moved to the locked position hereinbefore described.

As shown in Figs. 3 and 7, the points of contact or connection between the rock-shaft arms and the finger-operated levers vary from one end of the series to the other, so that although the two shafts which pivotally support the said arms and levers are parallel, yet the amount of movement imparted to the rock-shaft by the uniformly movable keys or finger pieces is progressively greater from one end to the other of the series.

To check the travel of the carriage so that its stopping may not be accompanied by too severe a jar, I provide a brake such as shown in Figs. 1, 3 and 12, in which 61 indicates the usual shell or case containing the carriage-shifting spring, and which case revolves first in one direction and then in the other as the carriage moves. A brake shoe 62 adapted to bear against one side of the case 61 carried by one end of an elbow arm 63 which is secured to a clamp 64, the latter being mounted on a pivot rod 65. The other end of the arm 63 is connected by a link 66 to an arm 67 of the swinging bar or gate 46. Therefore, whenever the bar 46 is actuated so as to release the dog 24 from the rack 23 as shown in Fig. 2, the brake shoe 62 is simultaneously applied to the case or wheel 61 as shown in Fig. 12.

As I have described the operations of the several parts of the mechanism in connection with the description of the construction of said parts, the operation of the machine as a whole will be readily understood without further description.

Having now described my invention, what I claim is:—

1. A tabulating mechanism for typewriting machines, comprising a rock shaft supported by the frame of the machine and having an arm projecting therefrom, said arm having a series of stop members in stepped relation to each other, means for adjustably supporting one or more co-operating stops on the carriage, a series of arms connected to said shaft, a plurality of finger pieces or keys, and an independent lever connecting each of said keys with one of said series of arms for variably rocking said shaft.

2. A tabulating mechanism for typewriting machines, comprising a rock shaft supported by the frame of the machine and having an arm projecting therefrom, said arm having a series of stop members in stepped relation to each other, means for adjustably supporting one or more co-operating stops on the carriage, a series of arms connected to said shaft, a plurality of finger pieces or keys, and an independent and adjustable connection between each of said keys and one of said series of arms.

3. A tabulating mechanism for typewriting machines, comprising a rock shaft supported by the frame of the machine and having an arm provided with a series of stop members in stepped relation to each other, means for adjustably supporting one or more co-operating stops on the carriage, a series of arms connected to said shaft, a plurality of finger pieces or keys, and an independent and adjustable and disconnectible connection between each of said keys and one of said series of arms.

4. A tabulating mechanism for typewriting machines, comprising a rock shaft supported by the frame of the machine and having an arm projecting therefrom, said arm having a series of stop members in stepped relation to each other, means for adjustably supporting one or more co-operating stops on the carriage, a series of arms connected to said shaft, a plurality of finger pieces or keys, an independent lever connecting each of said keys with one of said series of arms for variably rocking said shaft, a brake for checking the travel of the carriage, and connections whereby the actuation of either finger piece or key will apply the brake after actuating the rock shaft.

5. A tabulating mechanism for typewriting machines, comprising a rock shaft supported by the frame of the machine and having an arm projecting therefrom, said arm having a series of stop members in stepped relation to each other, means for adjustably supporting one or more co-operating stops on the carriage, a series of arms connected to said shaft, a plurality of finger pieces or keys, a series of levers operated by said finger-pieces or keys and pivotally supported in a line substantially parallel with said rock-shaft, and connections between said rock-shaft arms and levers, said connections varying in distance from the rock-shaft for the purpose described.

6. A tabulating mechanism for typewriting machines, comprising a rock shaft supported by the frame of the machine and having an arm projecting therefrom, said arm having a series of stop members in stepped relation to each other, means for adjustably supporting one or more co-operating stops on the carriage, a series of arms connected to said shaft, a plurality of finger pieces or keys located at the front of the machine and extending rearward therefrom, and an independent lever connecting each of said keys with one of said series of arms for variably rocking said shaft.

7. A tabulating mechanism for typewriting machines comprising a bar attached to the carriage and having a longitudinally adjustable stop, a shaft mounted on the frame of the machine and having an arm carrying a plurality of stepped stop pins to co-act with said stops, a series of arms connected to said shaft, a plurality of finger pieces or keys, and an independent lever connecting each of said keys with one of said series of arms for variably rocking said shaft.

8. A tabulating mechanism for typewriting machines comprising a rock shaft supported by the frame of the machine and having an arm projecting therefrom, said arm having a series of stop members in stepped relation to each other, means for adjustably supporting one or more co-operating stops on the carriage, a series of slotted arms connected to said shaft, a plurality of finger pieces or keys, a series of slotted levers operatively connected with said finger pieces or keys, and independent connections between the slotted portions of said levers and arms.

9. A tabulating mechanism for typewriting machines comprising a rock shaft supported by the frame of the machine and having an arm projecting therefrom, said arm having a series of stop members in stepped relation to each other, means for adjustably supporting one or more co-operating stops on the carriage, a series of slotted arms connected to said shaft, a series of slotted levers, finger pieces or keys, connected with said levers, and an independent connection between each slotted lever and its adjacent slotted arm, said connection comprising a plate having a hook adjustably connected to one of said slotted members and a pin adjustably connected with the other slotted member to be engaged by said hook.

10. A tabulating mechanism for typewriting machines comprising a rock shaft supported by the frame of the machine and having an arm projecting therefrom, said arm having a series of stop members in stepped relation to each other, means for adjustably supporting one or more co-operating stops on the carriage, a series of arms connected to said shaft, and an independent connection between each of said keys and one of said series of arms for variably rocking said shaft, a plurality of finger pieces or keys, each having a collar, a brake for the carriage, a swinging bar or gate to be operated by either of said collars, and means whereby the swinging of the gate will apply the brake.

11. A tabulating mechanism for typewriting machines, comprising a rock shaft supported by the frame of the machine and having an arm provided with a series of stop members in stepped relation to each other, means for adjustably supporting one or more co-operating stops on the carriage, a series of slotted arms connected to said shaft and depending therefrom, a series of slotted levers supported by the frame of the machine, an independent connection between each of said keys and one of said series of arms for variably rocking said shaft, and push rods mounted on the frame of the machine and having finger pieces or keys at the front of the machine, the rear ends of said push rods being connected with said slotted levers.

In testimony whereof I affix my signature, in presence of two witnesses.

PHILO B. TINGLEY.

Witnesses:
M. W. TINGLEY,
A. F. EASTWOOD.